(12) United States Patent
Hayden et al.

(10) Patent No.: US 6,662,801 B2
(45) Date of Patent: Dec. 16, 2003

(54) CELESTIAL TRACKING APPARATUS AND METHOD OF CONTROLLING WIND STOW THEREFOR

(75) Inventors: Herbert T. Hayden, Tempe, AZ (US); James C. Warrick, Prescott, AZ (US); Jefferson G. Shingleton, Auburn, NY (US); Raymond S. Zuckerman, Scottsdale, AZ (US)

(73) Assignee: Pinnacle West Capital Corporation, Phoenix, AZ (US)

(*) Notice: Subject to any disclaimer, the term of this patent is extended or adjusted under 35 U.S.C. 154(b) by 184 days.

(21) Appl. No.: 09/970,186

(22) Filed: Oct. 2, 2001

(65) Prior Publication Data

US 2003/0062037 A1 Apr. 3, 2003

(51) Int. Cl.[7] .................................................. F24J 2/46
(52) U.S. Cl. .......................... 126/571; 126/572; 126/600
(58) Field of Search ................................. 126/570, 571, 126/572, 573, 600

(56) References Cited

U.S. PATENT DOCUMENTS

| | | | | |
|---|---|---|---|---|
| 3,059,889 A | * | 10/1962 | Pottmeyer | 248/183.4 |
| 4,172,739 A | * | 10/1979 | Tassen | 136/246 |
| 4,256,088 A | * | 3/1981 | Vindum | 126/571 |
| 4,354,484 A | | 10/1982 | Malone et al. | 126/425 |
| 4,362,931 A | * | 12/1982 | Maruko et al. | 250/203.4 |
| 4,439,020 A | * | 3/1984 | Maruko | 359/729 |
| 4,458,670 A | * | 7/1984 | Lhenry | 126/601 |
| 4,583,520 A | | 4/1986 | Dietrich et al. | 126/424 |
| 4,620,771 A | * | 11/1986 | Dominguez | 359/591 |
| 4,870,949 A | | 10/1989 | Butler | 126/424 |
| 4,883,340 A | * | 11/1989 | Dominguez | 359/593 |
| 5,119,105 A | | 6/1992 | Ngai et al. | 343/703 |
| 5,325,844 A | | 7/1994 | Rogers et al. | 126/605 |
| 5,758,938 A | * | 6/1998 | Osterwisch | 353/3 |
| 6,123,067 A | | 9/2000 | Warrick | 126/593 |
| 6,363,928 B1 | * | 4/2002 | Anderson, Jr. | 126/577 |

FOREIGN PATENT DOCUMENTS

| | | | | |
|---|---|---|---|---|
| JP | 11-273424 | * | 10/1999 | 126/571 |
| WO | WO 88/04016 | * | 2/1988 | 126/571 |

OTHER PUBLICATIONS

Author: Robert Brown Title: MMA Project Book Date: Aug. 26, 1999 pp.: 15.

Author: R. A. Duncan, J.J Kesteven and R. N. Manchester Title: Australia Telescope Compact Array User's Guide Date: Oct. 1999 pp.: 15.

* cited by examiner

Primary Examiner—Carl D. Price
(74) Attorney, Agent, or Firm—Lowell W. Gresham; Jordan M. Meschkow; Meschkow & Gresham, P.L.C.

(57) ABSTRACT

A celestial tracking apparatus (20) has a support (26), a tracking assembly (28) coupled to the support (26) by an azimuth pivot (36), a collector assembly (30) coupled to the tracking assembly (28) by an elevation pivot (38), a wind-speed sensor (172), and a controller (150) coupled to the azimuth and elevation pivots (36,38) and configured to cause the collector assembly (30) to assume a wind-stow position (66) when the sensor (172) detects a wind having a speed greater than a predetermined speed, upon failure of a component of the apparatus (20), or upon receipt of a wind-stow command. The collector assembly (30) has a solar collector (22) with a substantially flat surface (24), a center of gravity (52), and a target axis (54) substantially perpendicular to the substantially flat surface (24) and passing through the center of gravity (52). The elevation pivot (38) is displaced from the target axis (54) and the center of gravity (52) so that the collector assembly (30) is predisposed to pivot to the wind-stow position.

30 Claims, 10 Drawing Sheets

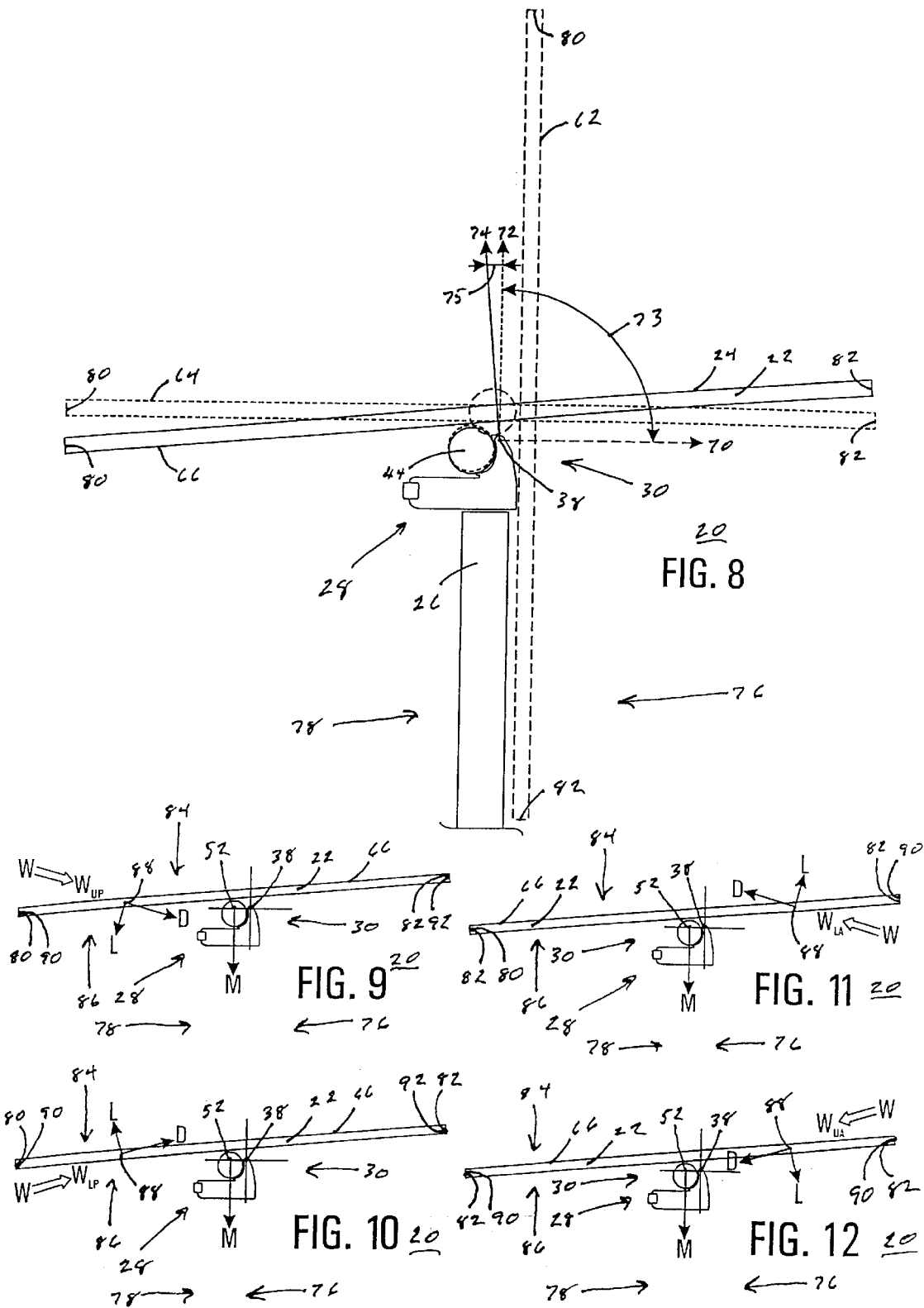

CELESTIAL TRACKING APPARATUS AND METHOD OF CONTROLLING WIND STOW THEREFOR

TECHNICAL FIELD OF THE INVENTION

The present invention relates to the field of celestial tracking apparatuses. More specifically, the present invention relates to the field of wind stow of celestial tracking apparatuses.

BACKGROUND OF THE INVENTION

Celestial tracking apparatuses are devices that track or face a given object in the celestial hemisphere during normal operations. Celestial tracking apparatuses are typically configured for use as radio telescopes, radar systems, solar collectors, etc.

The object being tracked is typically moving relative to the surface of the Earth, and the celestial tracking apparatus must be able to accurately track the object.

A celestial tracking apparatus may be large. For example, the Lovell radio telescope at the Jodrell Bank Observatory of the University of Manchester at Macclesfield, Cheshire, United Kingdom, has a dish diameter of 76.2 m (approximately 250 ft.), resulting in a collection area of over 4560 m$^2$ (approximately 49,100 sq.ft.). More directly, in an exemplary photovoltaic (PV) solar power collection unit used throughout this discussion, the collector is a substantially flat PV array having an approximate frontal surface of 13.6×15.8 m (approximately 44.6×51.8 ft.), resulting in a collection area in excess of 214 m$^2$ (approximately 2,300 sq.ft.).

Celestial tracking assemblies presenting large collection areas to the wind are subject to considerable wind stresses. When the wind exceeds a given speed, these stresses may become destructive. The celestial tracking assemblies are therefore configured to assume a predetermined attitude when the wind acting upon them exceeds a predetermined excessive wind speed. This attitude is known as wind stow.

Several problems exist with conventional methods and structures for placing tracking apparatuses into wind stow. All such methods and structures involve compromises in cost, maximum apparatus size, reliability, and safety.

When in wind stow, the collector (i.e., the movable portion of the celestial tracking apparatus that actually faces or points to the celestial object) is positioned to minimize the effects of the wind. This is accomplished in several ways.

When in wind stow where the accumulation of ice and snow may be a problem, the collector is often positioned to face downwind substantially horizontally. This allows the collector to receive the wind at its back, where structural members may be positioned to absorb the wind-induced stresses without interfering with normal operation. In many cases, a smaller collector is configured to "weathervane," i.e., to freely pivot azimuthally so that the collector may maintain its downwind position as the wind shifts.

When in wind stow where the accumulation of ice and snow are not a consideration, as for a solar power collection unit located in a desert environment, the collector is often positioned to point vertically, i.e., at the zenith. When pointing vertically, the collector itself is substantially horizontal (parallel to the ground) and less affected by substantially horizontal winds.

A vertically pointing wind-stow position is suitable for a truly horizontal wind, as the collector then presents a symmetrical edge regardless of wind direction. A problem exists, however, in that a wind is typically only approximately horizontal, and often has an upward or downward component. This upward or downward component is usually the result of wind movement over the nearby terrain (hills, cliffs, etc.) or obstructions (buildings, walls, etc.).

Unless, the upward or downward wind component is severe, (e.g., greater than 15°), a vertically pointing wind-stow position remains suitable for a dish-type collector. Such a collector presents a symmetrical edge to a substantially horizontal wind from any direction.

For a substantially horizontal flat collector (i.e., a collector pointing at the zenith), a problem exists in that the presence of even a small upward or downward component in the wind interacts with the collector to produce an airfoil effect. This airfoil effect produces a force, lift, which acts substantially perpendicularly to the wind. With an anterior or posterior wind, i.e., a substantially horizontal wind substantially perpendicular to the axis of the elevation pivot, this force would attempt to drive the collector out of wind stow. This places an additional burden upon the elevation pivot and actuators coupling the collector assembly to the rest of the celestial tracking apparatus.

Another problem exists in that a potentially destructive wind may occur rapidly. This is exemplified by the haboobs that occur in the subtropical desert regions worldwide. Such a haboob may cause a shift in wind speed from less than 4.5 m/s (approximately 10 mph) to greater than 25 m/s (approximately 56 mph) in less than 30 s. Conventional celestial tracking apparatuses typically take several minutes to shift from normal operation into wind stow. The transition from normal operation occurs far too slowly to provide adequate protection against the onset of a severe haboob. Unfortunately, those locations that are ideal for solar collectors, the subtropical deserts, are also those locations most prone to haboobs and other abrupt wind phenomena.

Rapid wind stow, while desirable, creates an additional problem. Wind stow is desirably performed automatically. That is, the celestial tracking apparatus desirably should itself detect the presence of a potentially damaging wind and place itself into wind stow without human intervention. Therefore, if a celestial tracking apparatus were to be built that could place itself into wind stow rapidly enough to handle the onset of a haboob, that celestial tracking apparatus would then pose a hazard to maintenance personnel. For example, an individual may be trapped and crushed by a rapidly descending collector assembly. It is therefore desirable for maintenance personnel to be able to temporarily disable automatic wind stow.

It is desirable that a celestial tracking apparatus automatically enter wind stow in response to wind exceeding a predetermined excessive wind speed for a predetermined length of time. It is also desirable that the celestial tracking apparatus automatically exit wind stow when the wind has subsided, i.e., when the wind is less than a second predetermined safe wind speed for a second predetermined length of time.

When in wind stow, the collector assembly is placed in a safe position. That is, a celestial tracking apparatus in wind stow is prepared for adverse weather, etc. This makes it desirable that an inoperative celestial tracking apparatus be placed in wind stow. Desirably, a system failure would cause the system to default into wind stow, i.e., the system would be "fail-safe" for wind stow. "Fail-safe," as used herein, is taken to mean "equipped with a secondary system that insures continued operation even if the primary system fails," Random House Webster's Unabridged Electronic Dictionary, copyright © 1996 by Random House, Inc. For example, were the electrical power to fail because-of an advancing storm, the celestial tracking apparatus desirably has some means of automatically reverting to wind stow without electric power so as to prevent damage to the celestial tracking apparatus upon arrival of the storm. This presents a problem for conventional wind-stow methods as structures, where power is required to place the apparatus into wind stow. Typical solutions are batteries and/or auxiliary generators, which add to the cost and complexity while decreasing decrease the reliability of the apparatus.

Since a celestial tracking apparatus in wind stow is prepared for adverse weather, etc., it is desirable that wind stow be capable of being maintained indefinitely on demand. That is, a celestial tracking apparatus intentionally placed in wind stow should desirably remain in wind stow, without application of power or control, until intentionally released from wind stow. This allows celestial tracking apparatuses taken out of service for extended periods to be protected against adverse weather.

SUMMARY OF THE INVENTION

Accordingly, it is an advantage of the present invention that a celestial tracking apparatus and method of controlling wind stow therefor is provided.

It is another advantage of the present invention that a method is provided for automatically placing a celestial tracking apparatus into wind stow when a wind exceeds a predetermined excessive wind speed for a predetermined length of time.

It is another advantage of the present invention that a method is provided for automatically removing a celestial tracking apparatus from wind stow when a wind has abated below a predetermined safe wind speed for a predetermined length of time.

It is another advantage of the present invention that a method is provided for automatically placing a celestial tracking apparatus into wind stow upon occurrence of a system failure.

It is another advantage of the present invention that a method is provided for directly placing a celestial tracking apparatus into wind stow.

It is another advantage of the present invention that a method is provided for indefinitely retaining a celestial tracking apparatus in wind stow.

It is another advantage of the present invention that a method is provided for inhibiting a celestial tracking apparatus from entering wind stow.

The above and other advantages of the present invention are carried out in one form by a celestial tracking apparatus formed of a support, a tracking assembly, a first pivot coupled between the support and the tracking assembly, a collector assembly, and a second pivot coupled between the tracking assembly and the collector assembly. The collector assembly has a center of gravity, a facing plane, and a target axis substantially perpendicular to the facing plane and passing through the center of gravity. The second pivot is displaced from the target axis and the center of gravity thereupon.

The above and other advantages of the present invention are carried out in another form by a method of controlling the placement of a collector assembly of a celestial tracking apparatus into a wind-stow position. The collector assembly has a center of gravity, a facing plane, and a target axis substantially perpendicular to the facing plane and passing through the center of gravity. The method includes pivoting the collector assembly about a pivot displaced from the target axis and the center of gravity.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 8 shows a simplified side view of the celestial tracking apparatus of FIG. 2 demonstrating relationships between proximally horizontal, vertical, and wind-stow positions in accordance with a preferred embodiment of the present invention;

FIG. 9 shows a simplified side view of the celestial tracking apparatus of FIG. 2 with a collector assembly in a wind-stow position and demonstrating forces generated by an upper-side posterior wind in accordance with a preferred embodiment of the present invention;

FIG. 10 shows a simplified side view of the celestial tracking apparatus of FIG. 2 with a collector assembly in a wind-stow position and demonstrating forces generated by a lower-side posterior wind in accordance with a preferred embodiment of the present invention;

FIG. 11 shows a simplified side view of the celestial tracking apparatus of FIG. 2 with a collector assembly in a wind-stow position and demonstrating forces generated by a lower-side anterior wind in accordance with a preferred embodiment of the present invention;

FIG. 12 shows a simplified side view of the celestial tracking apparatus of FIG. 2 with a collector assembly in a wind-stow position and demonstrating forces generated by an upper-side anterior wind in accordance with a preferred embodiment of the present invention;

DETAILED DESCRIPTION OF THE PREFERRED EMBODIMENTS

Figure 1:
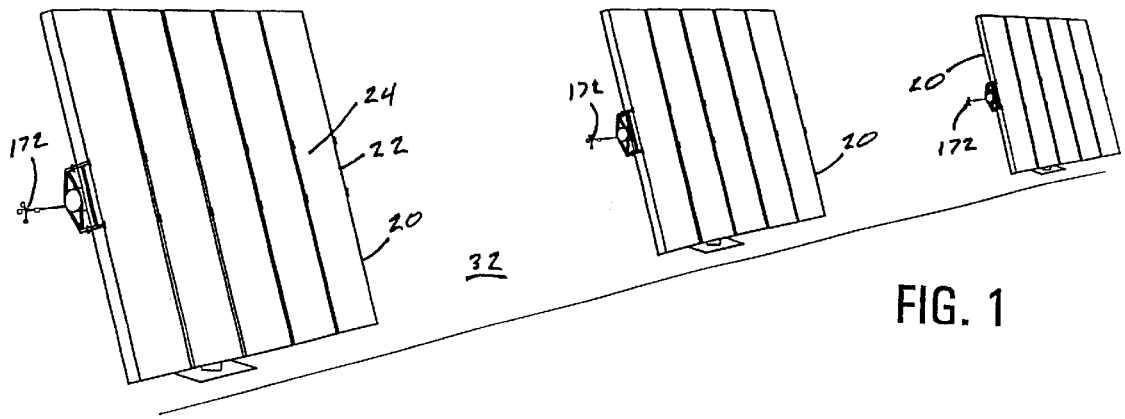
FIG. 1 shows a perspective front view of a plurality of celestial tracking apparatuses realized as solar power collection units in accordance with a preferred embodiment of the present invention.
Figure 2:
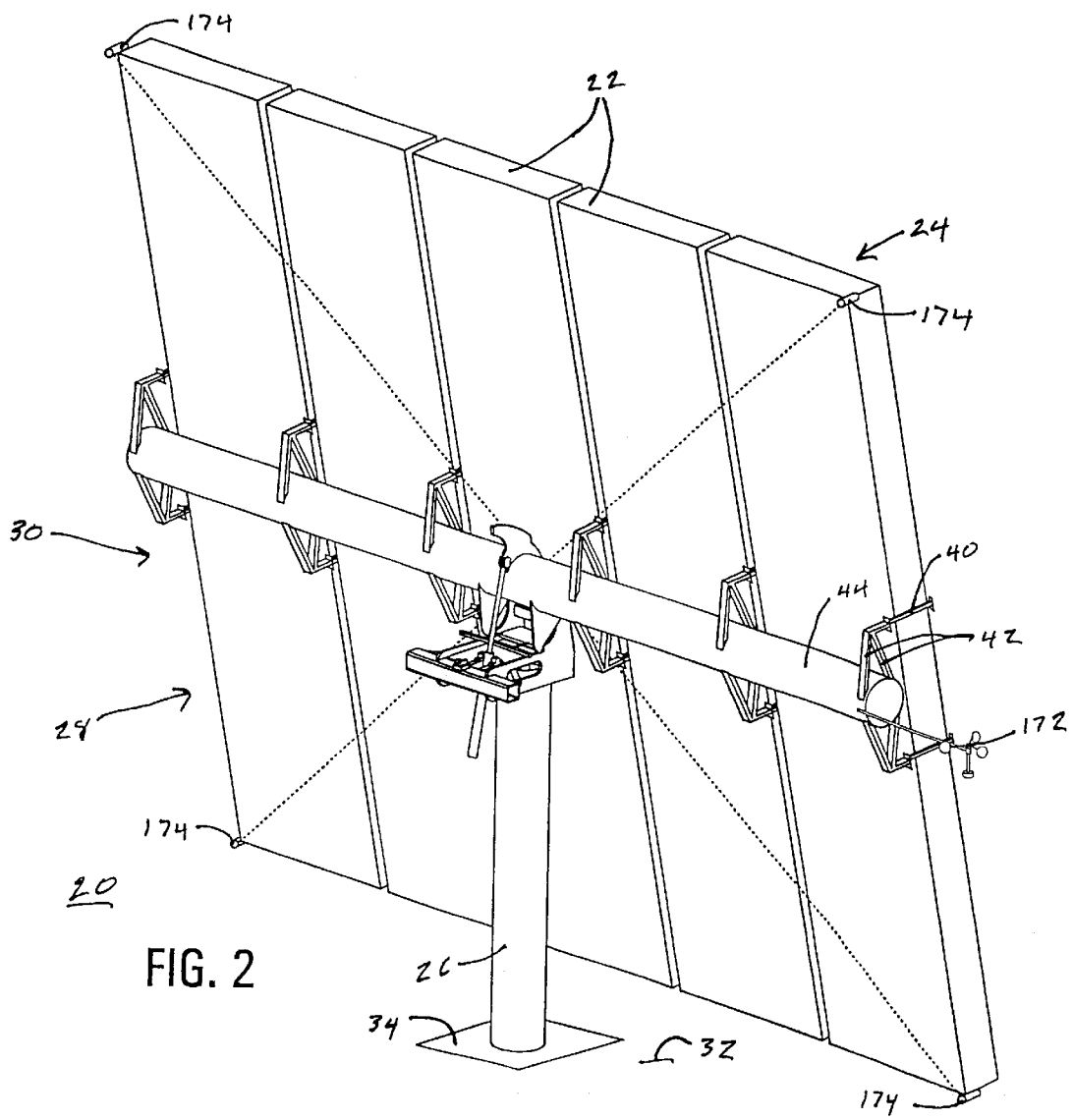
FIG. 2 shows an oblique rear view of one of the celestial tracking apparatuses of FIG. 1 in accordance with a preferred embodiment of the present invention.
Figure 3:
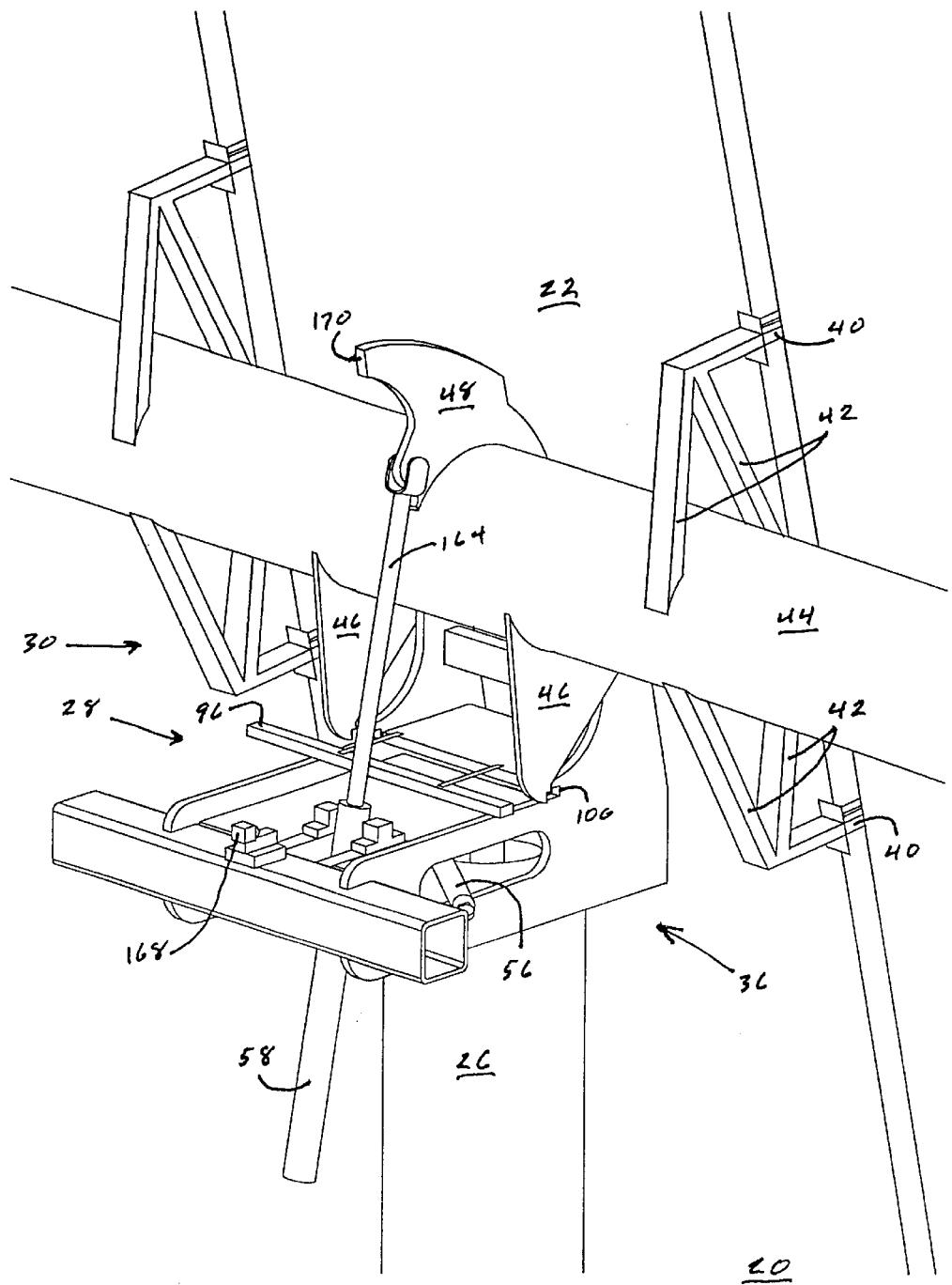
FIG. 3 shows an oblique rear view of a portion of the celestial tracking apparatus of FIG. 2 demonstrating components thereof positioned for normal operation in accordance with a preferred embodiment of the present invention.
Figure 4:
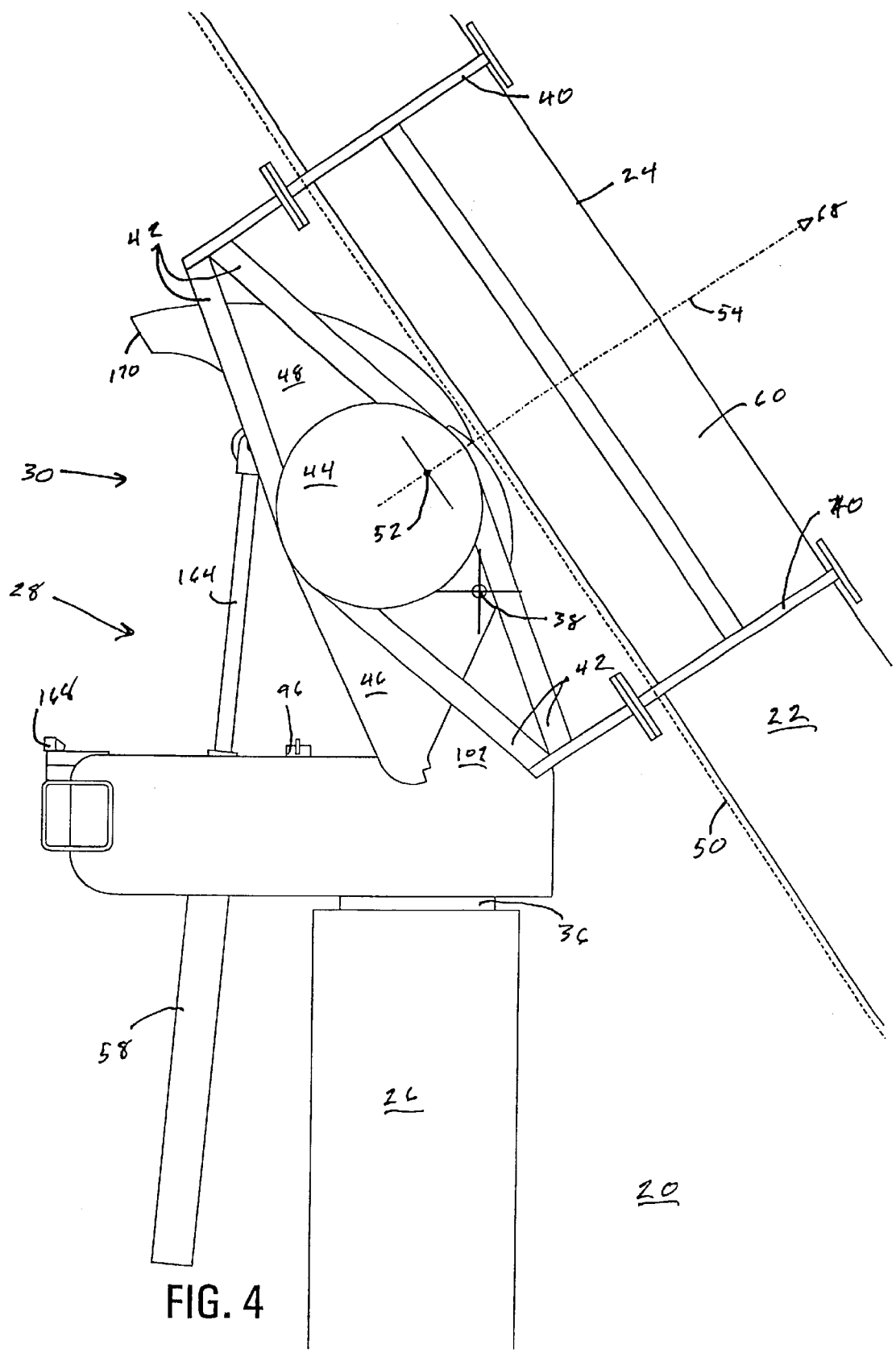
FIG. 4 shows a side view of the portion of the celestial tracking apparatus of FIG. 2 demonstrating a collector assembly in an arbitrary normal-operation position in accordance with a preferred embodiment of the present invention.

FIG. 1 shows a perspective front view of a plurality of celestial tracking apparatuses 20 realized as solar power collection units. FIG. 2 shows an oblique rear view of one of celestial tracking apparatuses 20. FIGS. 3 and 4 show a close up view and a side view, respectively, of a portion of FIG. 2 demonstrating components of apparatus 20 configured for normal operation. The following discussion refers to FIGS. 1 through 4.

In the preferred embodiment of the Figures, celestial-tracking apparatus 20 is exemplified in this discussion as a solar power collection unit, more specifically as a high-concentration photovoltaic (HCPV) solar generator. This solar power collection unit has a substantially flat collector 22 having a frontal surface 24 approximately 13.6×15.8 m (44.6×51.8 ft.), i.e., in excess of approximately 214 m$^2$ (2,310 sq.ft.). Additionally, celestial tracking apparatus 20 of the preferred embodiment utilizes hydraulic actuators (discussed hereinafter) to effect movement of collector assembly 22. Those skilled in the art will appreciate that celestial tracking apparatus 20 may be realized in other configurations, e.g., with a parabolic dish collector and/or electrical actuators, without departing from the spirit of the present invention.

In the preferred embodiment, celestial tracking apparatus 20 is formed of a support 26, tracking assembly 28, and collector assembly 30. As shown, support 26 is substantially a column anchored to the Earth 32 by a concrete pad 34, thereby providing a stable base for tracking assembly 28 and collector assembly 30. Those skilled in the art will appreciate that other forms of support 26 and other methods of anchoring may be used without departing from the spirit of the present invention.

Tracking assembly 28 is coupled to support 26 by a pivot 36 (FIG. 4). In the preferred embodiment, pivot 36 is realized as an azimuth pivot 36 coupled between support 26 and tracking assembly 28. Azimuth pivot is configured to allow tracking assembly 28 (and collector assembly 30 coupled thereto) to pivot about a vertical axis (not shown).

Collector assembly 30 is coupled to tracking assembly 28, and thence to support 26, by a pivot 38 (FIG. 4). In the preferred embodiment, pivot 38 is realized as a pair of elevation pivots 38, only one of which is shown in the Figures. Elevation pivots 38 are configured to allow collector assembly 30 to pivot about a horizontal axis (not shown).

Those skilled in the art will appreciate that the use of azimuth and elevation pivots 36 and 38 produces an altazimuth mounting. While an altazimuth mounting constitutes the preferred embodiment of the Figures, it is not a requirement of the present invention, and other pivoting formats, e.g., equatorial, may be used without departing from the spirit of the present invention.

Collector assembly 30 (FIG. 4) encompasses collector 22 and support and connection components. It will be appreciated that the exact shapes and descriptions of the support and collection components are not relevant to the present invention and may vary widely. In the preferred embodiment, these support and connection components include collector support legs 40, collector support members 42, torque tube 44, pivot levers 46, and overtravel stop lever 48.

Collector assembly 30 has a facing plane 50. Facing plane 50 is an arbitrary plane facing a celestial point (not shown), i.e., a point in the celestial hemisphere (such as the sun), at which collector 22 is aimed. Collector assembly 30 also has a center of gravity 52. Collector assembly 30 has a target axis 54, being a line passing through center of gravity 52, substantially perpendicular to facing plane 50, and extending to the celestial point. Target axis 54 is intimately and fixedly associated with collector 22. That is, any movement of collector 22, i.e., of collector assembly 30, results in a corresponding movement of target axis 54.

Collector assembly 30 encompasses collector 22. In the preferred embodiment, collector 22 is solar collector 22 having substantially flat frontal surface 24. Flat surface 24 is substantial parallel to facing plane 50. That is, in the preferred embodiment, the celestial point is substantially the position of the sun (not shown), and substantially flat surface 24 faces the sun in normal operation.

In normal operation, therefore, tracking assembly 28 causes azimuth and elevation pivots 36 and 38 to move so that target axis 54 substantially tracks the sun, i.e., continuously intersects the celestial position of the sun, thereby fulfilling the targeting requirements of an HCPV solar generator. In the preferred embodiment, an azimuth actuator 56 (FIG. 3) is used to pivot tracking assembly 28 about azimuth pivot 36, and an elevation actuator 58 (FIGS. 3 and 4) is used to pivot collector assembly 30 about elevation pivots 38.

Elevation pivots 38 are offset, i.e., elevation pivots are displaced from target axis 54 and center of gravity 52. The use of offset elevation pivots 38 is advantageous in the wind-stow control process (discussed hereinafter) of the present invention. It will be evident to one of ordinary skill in the art that, while this process may be used with any celestial tracking apparatus 20, the process is most practical with apparatus 20 having a collector with a collection area, i.e., substantially flat surface 24 or its equivalent, greater than 125 m$^2$ (approximately 1350 sq.ft.). In the preferred embodiment, substantially flat surface 24 of collector 22 has an area greater than 214 m$^2$ (approximately 2,310 sq.ft.).

FIGS. 4 through 7 show side views of a portion of celestial tracking apparatus 20 demonstrating collector assembly 30 in an arbitrary normal-operation position 60 (FIG. 4), in a proximally horizontal position 62 (FIG. 5), in a vertical position 64 (FIG. 6), and in a wind-stow position 66 (FIG. 7) in accordance with a preferred embodiment of the present invention. FIG. 8 shows a simplified side view of celestial tracking apparatus 20 demonstrating relationships between proximally horizontal position 62, vertical position 64, and wind-stow position 66 of collector assembly 30 in accordance with a preferred embodiment of the present invention. The following discussion refers to FIGS. 3 through 8.

During normal operation, celestial tracking apparatus 20 aims collector assembly 30 at a celestial point (not shown). That is, collector assembly 30 is made to assume normal-operation position 60 with target axis 54 projecting in a normal-operation direction 68 towards a point in the heavens. The celestial point may be any point in the celestial sphere inclusively between an arbitrary horizon and the zenith. The arbitrary horizon is defined as a closed line of celestial points at or above the true horizon and simultaneously at or above the minimum elevation of target axis 54 (i.e., the minimum elevation of collector assembly 30). The arbitrary normal-operation position 60 of FIG. 4 targets one such celestial point.

Azimuth actuator 56 (FIG. 3) is configured to direct target axis 54 to any azimuth (not shown) required to target any given celestial point. For purposes of simplicity, an appropriate azimuth will be assumed and this discussion is limited to elevation hereinafter except where specific azimuth information is required.

Figure 5:
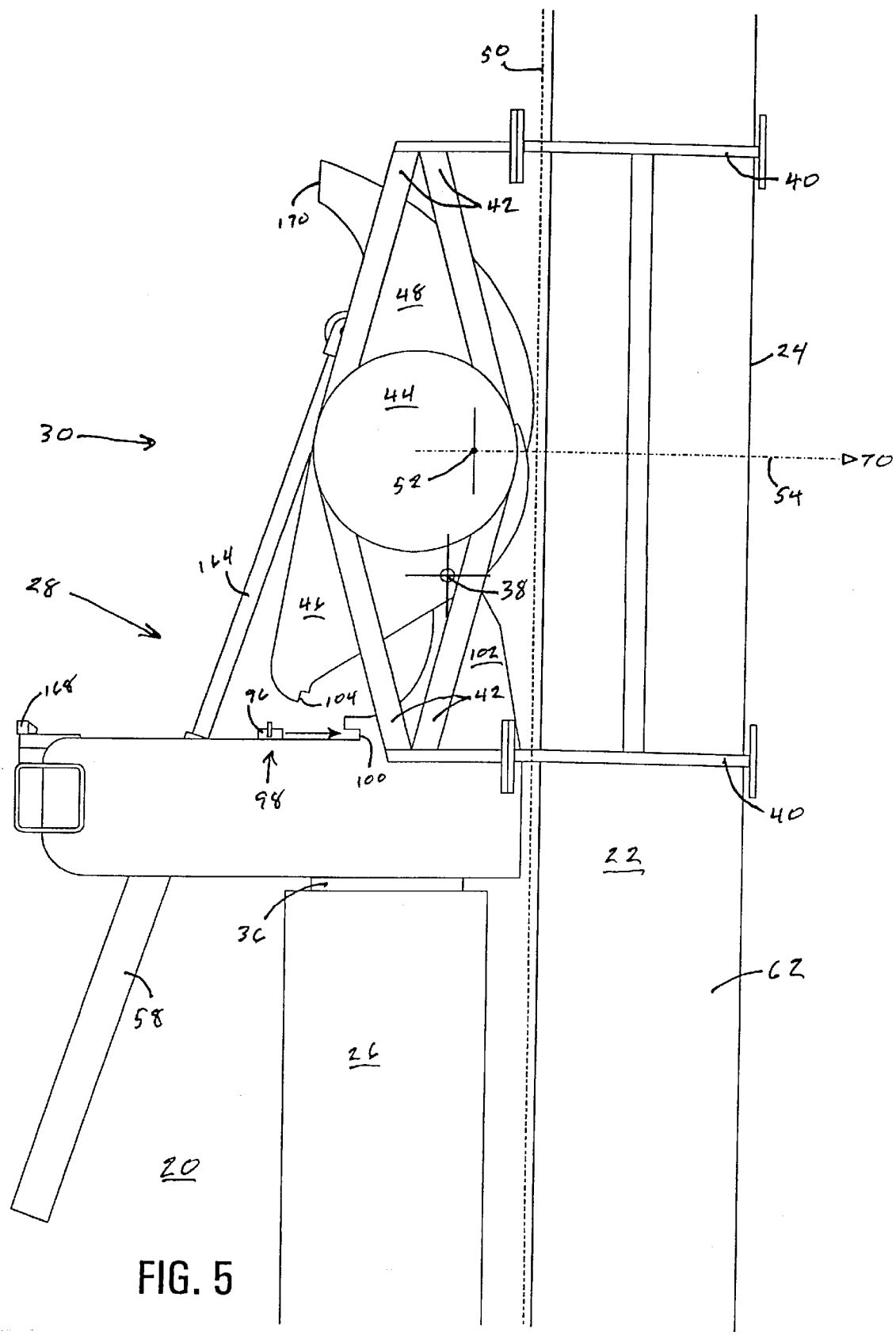
FIG. 5 shows a side view of the portion of the celestial tracking apparatus of FIG. 2 demonstrating a collector assembly in a proximally horizontal position in accordance with a preferred embodiment of the present invention.

In normal operation, elevation actuator 58 (FIGS. 3 through 7) is configured to pivot collector assembly 30 to any elevation inclusively between proximally horizontal position 62 (FIGS. 5 and 8) and vertical position 64 (FIGS. 6 and 8), i.e., is configured to cause target axis 54 to project anywhere inclusively between a proximally horizontal direction 70 and a vertical direction 72. In proximally horizontal direction 70, target axis has assumed its minimum elevation. In FIG. 5, this minimum elevation is shown as substantially horizontal. Those skilled in the art will realize, however, that this is not a requirement of the present invention, and proximally horizontal direction 70 may in fact be several degrees removed from the horizontal.

When in vertical direction 72 (FIGS. 6 and 8), target axis 54 is projected to the zenith, regardless of azimuth.

When in wind stow position 66 (FIGS. 7 and 8) elevation actuator 58 causes collector assembly 30 to pivot from normal-operation position 60 to wind-stow position 66. To achieve wind-stow direction 74, elevation actuator 58 causes target axis 54 to pivot from an arbitrary normal-operation direction 68 to beyond vertical direction 72. In the preferred embodiment, wind-stow direction 74 is between 1° and 7°, preferably 5°, farther from proximally horizontal direction 70 than vertical direction 72. This is demonstrated in FIG. 8 by an angle 73 between proximally horizontal direction 70 and vertical direction 72, and an angle 75 between vertical direction 72 and wind-stow direction 74.

FIGS. 9 through 12 show simplified side views of celestial tracking apparatus 20 with collector assembly 30 in wind-stow position 66 and demonstrate forces generated by an upper-side posterior wind $W_{UP}$ (FIG. 9), by a lower-side posterior wind $W_{LP}$ (FIG. 10), by a lower-side anterior wind $W_{LA}$ (FIG. 11), and by an upper-side anterior wind $W_{UA}$ (FIG. 12) in accordance with a preferred embodiment of the present invention. The following discussion refers to FIGS. 4, 5, and 7 through 12.

When collector assembly 30 pivots from normal-operation position 60 (FIG. 4) to wind-stow position 66 (FIGS. 7 and 8), it does so on elevation pivots 38. Elevation pivots 38 have an arbitrary azimuth orientation (not shown). The side of celestial tracking apparatus 20 facing the direction collector 22 would face were collector assembly 30 to be in proximally horizontal position 62 (FIG. 5) is therefor herein arbitrarily designated a front 76 of apparatus 20, with a reciprocal azimuth direction (i.e., a direction rotated azimuthally 180° from front 76) arbitrarily designated a back 78 of apparatus 20.

Elevation pivots 38 have an orientation that is substantially perpendicular to front and back 76 and 78. Elevation pivots 38 are also offset from center of gravity 52 of collector assembly 30. This offset is towards front 76 of celestial tracking apparatus 20. The mass of collector assembly 30 is centered at center of gravity 52. When collector assembly 30 is in wind-stow position 72, gravity acting upon the mass of collector assembly 30 exerts a force M (FIGS. 9 through 12) displaced from elevation pivots 38 towards back 78. Force M therefore serves both to predispose to pivot collector assembly 30 to enter wind-stow position 66, and to inhibit collector assembly 30 from leaving wind-stow position 72.

A wind W (FIGS. 9 through 12) may strike celestial tracking apparatus 20 from any azimuth. Wind W is approximately horizontal, but may have a vertical component of up to ±15°. Wind W may strike apparatus 20 laterally, i.e., from either side substantially midway between front and back 76 and 78. A lateral wind W pushes substantially perpendicularly to the normal direction of movement of elevation pivots 38, and thereby has the least effect upon wind stow. Conversely, wind W may strike apparatus 20 from front 76 (an anterior wind) or from back 78 (a posterior wind). An anterior or posterior wind W pushes with the normal direction of movement of elevation pivots 38, and thereby has the greatest effect upon wind stow. A given anterior or posterior wind W usually has some lateral component.

A wind W striking collector 22 generates two forces, lift L and drag D. Lift L is the component of an aerodynamic force acting substantially perpendicular to the motion of wind W. Lift L, acting upon wings, is the force that keeps an aircraft aloft. Lift L, acting upon collector 22, attempts to drive collector assembly 30 into or out of wind-stow position 66. Those skilled in the art will appreciate that the term "lift" is the name of the perpendicular aerodynamic force and does not describe an absolute direction. For a nearly horizontal surface, such as collector 22 when collector assembly 30 is in wind-stow position 66, lift L may act either upwards or downwards.

Drag D is the component of the aerodynamic force acting upon collector 22 substantially parallel to and in substantially the same direction as the motion of wind W.

When wind W strikes a substantially flat plate, as is collector 22 in the preferred embodiment, a point of force 88 is generated. Point of force 88 is the point at which lift L and drag D appear to be generated, i.e., is the point representing the average of all independent lift L and drag D forces over the entire surface of collector 22. Because of aerodynamic properties, point of force 88 is not centered upon collector 22, but is moved upwind. This means, for a flat plate pivoted at or near its center, as is collector 22, the leading half has a greater amount of lift L and drag D than the trailing half. This is demonstrated in FIGS. 9 through 12 where point of force 88 is shown closer to a leading edge 90 of collector 22 than to a trailing edge 92 thereof.

In the preferred embodiment, when collector assembly 30 is in wind-stow position 66, collector 22 is approximately 5° past horizontal. That is, a normally top edge 80 of collector 22 is at back 78 of celestial tracking apparatus 20 and is lower than a normally bottom edge 82 of collector 22. Collector 22 slants approximately 5° backwards. Substantially flat front surface 24 of collector 22 is now an upper side 84, and an opposite surface of collector 22 is a lower side 86.

FIG. 9 demonstrates lift L and drag D as generated at point of force 88 by upper-side posterior wind $W_{UP}$ acting upon collector 22 when collector assembly 30 is in wind-stow position 66. Because wind $W_{UP}$ is approaching from back 78, normally top edge 80 is leading edge 90 and normally bottom edge 82 is trailing edge 92. Point of force 88 is therefore shifted towards normally top edge 80.

Wind $W_{UP}$ strikes upper side 84 of collector 22. Lift L acts downward proximate leading edge 90, i.e., normally top edge 80, of collector 22. Lift L therefore augments mass force M, on the same side of elevation pivot 38, and inhibits collector assembly 30 from exiting wind-stow position 66. To a lesser degree, drag D may also act towards lower side 86 and may further serve to inhibit collector assembly 30 from exiting wind-stow position 66.

FIG. 10 demonstrates lift L and drag D as generated at point of force 88 by a lower-side posterior wind $W_{LP}$ acting upon collector 22 when collector assembly 30 is in wind-stow position 66. Because wind $W_{LP}$ is approaching from back 78, normally top edge 80 is leading edge 90 and normally bottom edge 82 is trailing edge 92. Point of force 88 is therefore shifted towards normally top edge 80.

Wind $W_{LP}$ strikes lower side 86 of collector 22. Lift L acts upward proximate leading edge 90, i.e., normally top edge 80, of collector 22. Lift L therefore opposes mass force M, on the same side of elevation pivot 38, and attempts to drive collector assembly 30 from wind-stow position 66. To a lesser degree, drag D may also act towards upper side 84 and may further serve to drive collector assembly 30 from wind-stow position 66.

Because mass force M always serves to inhibit collector assembly 30 from exiting wind-stow position 66, lift L and drag D together must be greater than mass force M before collector assembly 30 may reach equilibrium. Lift L and drag D must then be sufficiently greater than mass force M to overcome any latching device (discussed hereinafter) or other mechanism serving to inhibit collector assembly 30 from exiting wind-stow position 66. The small angle between-wind $W_{LP}$ and collector 22 makes drag D and lift L small in FIG. 10.

FIG. 11 demonstrates lift L and drag D as generated at point of force 88 by a lower-side anterior wind $W_{LA}$ acting upon collector 22 when collector assembly 30 is in wind-stow position 66. Because wind $W_{LA}$ is approaching from front 76, normally bottom edge 82 is leading edge 90 and normally top edge 84 is trailing edge 92. Point of force 88 is therefore shifted towards normally bottom edge 82.

Wind 60 strikes lower side 86 of collector 22. Lift L acts upward proximate leading edge 90, i.e., normally bottom edge 82, of collector 22. Lift L therefore augments mass force M, on the opposite side of elevation pivot 38, and inhibits collector assembly 30 from exiting wind-stow position 66. To a lesser degree, drag D may also act towards upper side 84 and may further serve to inhibit collector assembly 30 from exiting wind-stow position 66.

FIG. 12 demonstrates lift L and drag D as generated at point of force 88 by an upper-side anterior wind $W_{UA}$ acting upon collector 22 when collector assembly 30 is in wind-stow position 66. Because wind $W_{UA}$ is approaching from front 76, normally bottom edge 82 is leading edge 90 and normally top edge 84 is trailing edge 92. Point of force 88 is therefore shifted towards normally bottom edge 82.

Wind $W_{UA}$ strikes upper side 84 of collector 22. Lift L acts downward proximate leading edge 90, i.e., normally bottom edge 82, of collector 22. Lift L therefore opposes mass force M, on the opposite side of elevation pivot 38, and attempts to drive collector assembly 30 from wind-stow position 66. To a lesser degree, drag D may also act towards lower side 86 and may further serve to drive collector assembly 30 from wind-stow position 66. The small angle between wind $W_{UP}$ and collector 22 makes drag D and lift L-small in FIG. 10.

Because mass force M always serves to inhibit collector assembly 30 from exiting wind-stow position 66, lift L and drag D together must be greater than mass force M before collector assembly 30 may reach equilibrium. The choice of wind stow position 66 makes the "angle of attack" between collector 22 and wind W small in those cases, FIGS. 10 and 12, where lift L and drag D tend to move collector 22 out of wind stow. A small angle of attack is associated with small lift L and drag D. Lift L and drag D must then be sufficiently greater than mass force M to overcome any latching device (discussed hereinafter) or other mechanism serving to inhibit collector assembly 30 from exiting wind-stow position 66.

Figure 13:
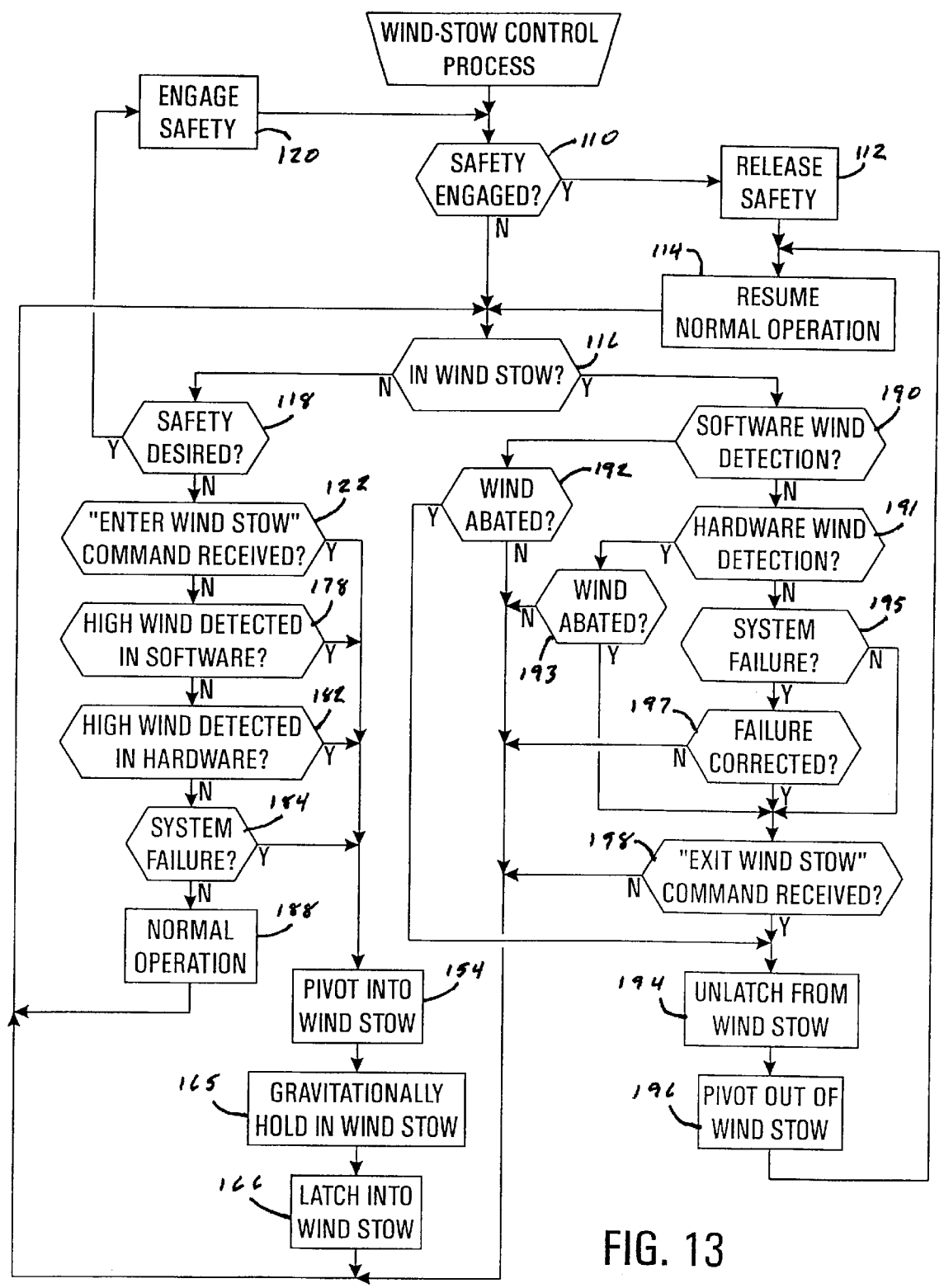
FIG. 13 shows a flowchart of a wind-stow control process for a celestial tracking apparatus in accordance with a preferred embodiment of the present invention.

FIG. 13 shows a flowchart of a wind-stow control process 94 for celestial tracking apparatus 20 in accordance with a preferred embodiment of the present invention. The following discussion refers to FIGS. 2, 4, 7, and 13.

Figure 7:
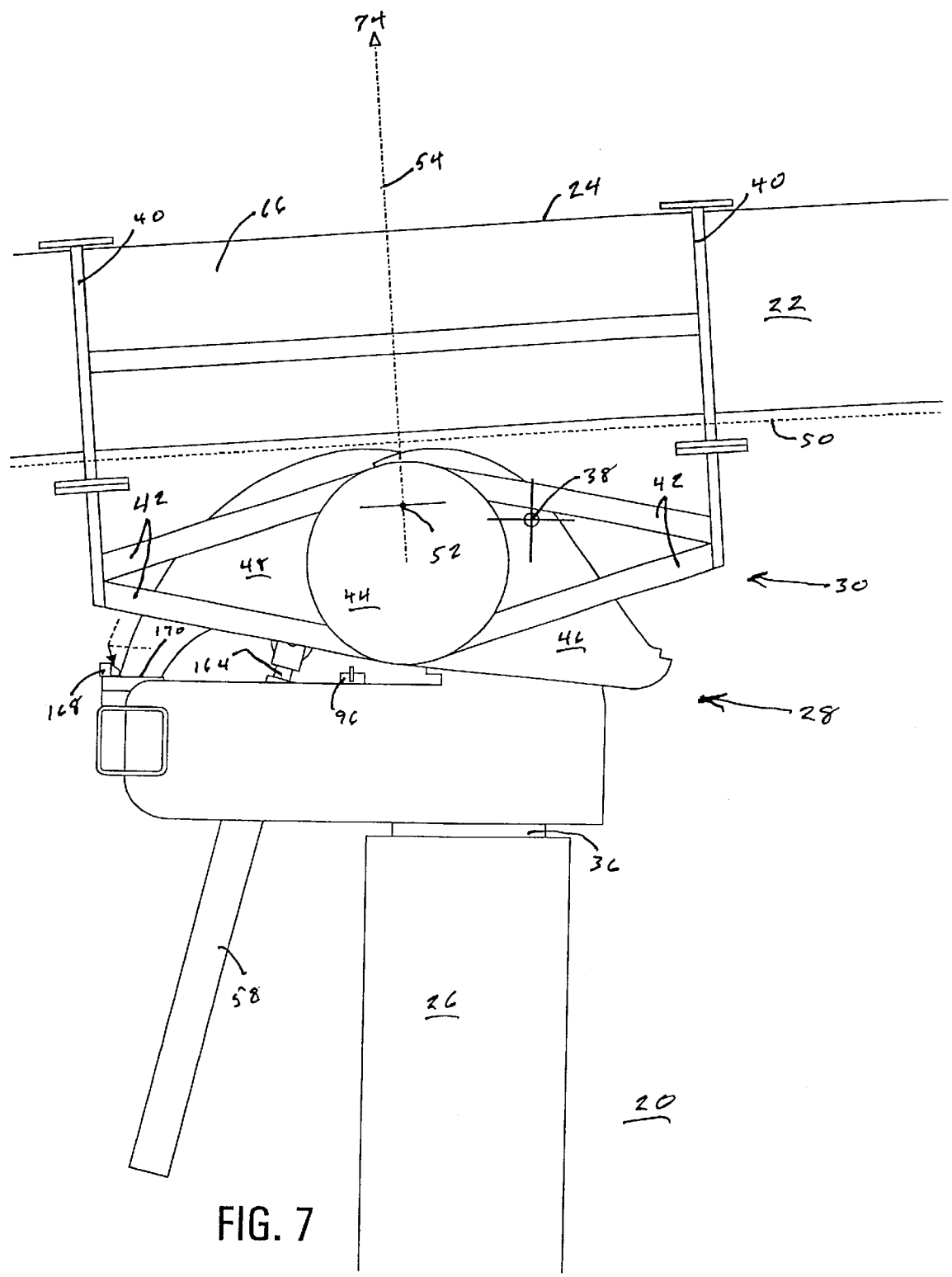
FIG. 7 shows a side view of the portion of the celestial tracking apparatus of FIG. 2 demonstrating a collector assembly in a Wind-stow position in accordance with a preferred embodiment of the present invention.

Process 94 (FIG. 13) places celestial tracking apparatus 20 (FIG. 2) into wind stow. That is, process 94 causes collector assembly 30 to pivot about elevation pivots (FIGS. 4 and 7) from an arbitrary normal-operation position 60 into wind-stow position 66 (FIG. 7).

Those skilled in the art will appreciate that process 94 in a composite of automatic and manual tasks. Automatic tasks may be performed though intentional or unintentional actions. Apparatus 20 is designed to move into wind stow automatically, i.e., wind stow is the "normal" state of apparatus 20. Therefore, as discussed hereinafter, apparatus 20 moves into wind stow unless an action is taken to prevent such movement. Automatic tasks represent an intentional or unintentional action on the part of one or more controllers (discussed hereinafter) to place apparatus 20 into wind stow, i.e., to allow wind-stow to occur. Manual tasks are typically performed by an operator and/or a technician, and are used to perform operations affecting the safety of personnel and/or equipment.

It is desirable that process 94 automatically place apparatus 20 into wind stow whenever a wind is detected having a speed above a predetermined excessive wind speed for a predetermined length of time (a high-winds condition), then automatically remove apparatus 20 from wind stow when the wind has abated to a speed below a predetermined safe wind speed for a predetermined period of time. It is desirable that process 94 automatically place apparatus 20 into wind stow whenever a system failure is detected (a failure condition), then remove apparatus 20 from wind stow when the failure has been corrected and an "exit wind stow" command has been received from an operator. It is also desirable that process 94 place apparatus 20 into wind stow upon receipt of an operator or remote sensor "enter wind stow" command or remove apparatus 20 from wind stow upon receipt of an operator "exit wind stow" command.

Figure 14:
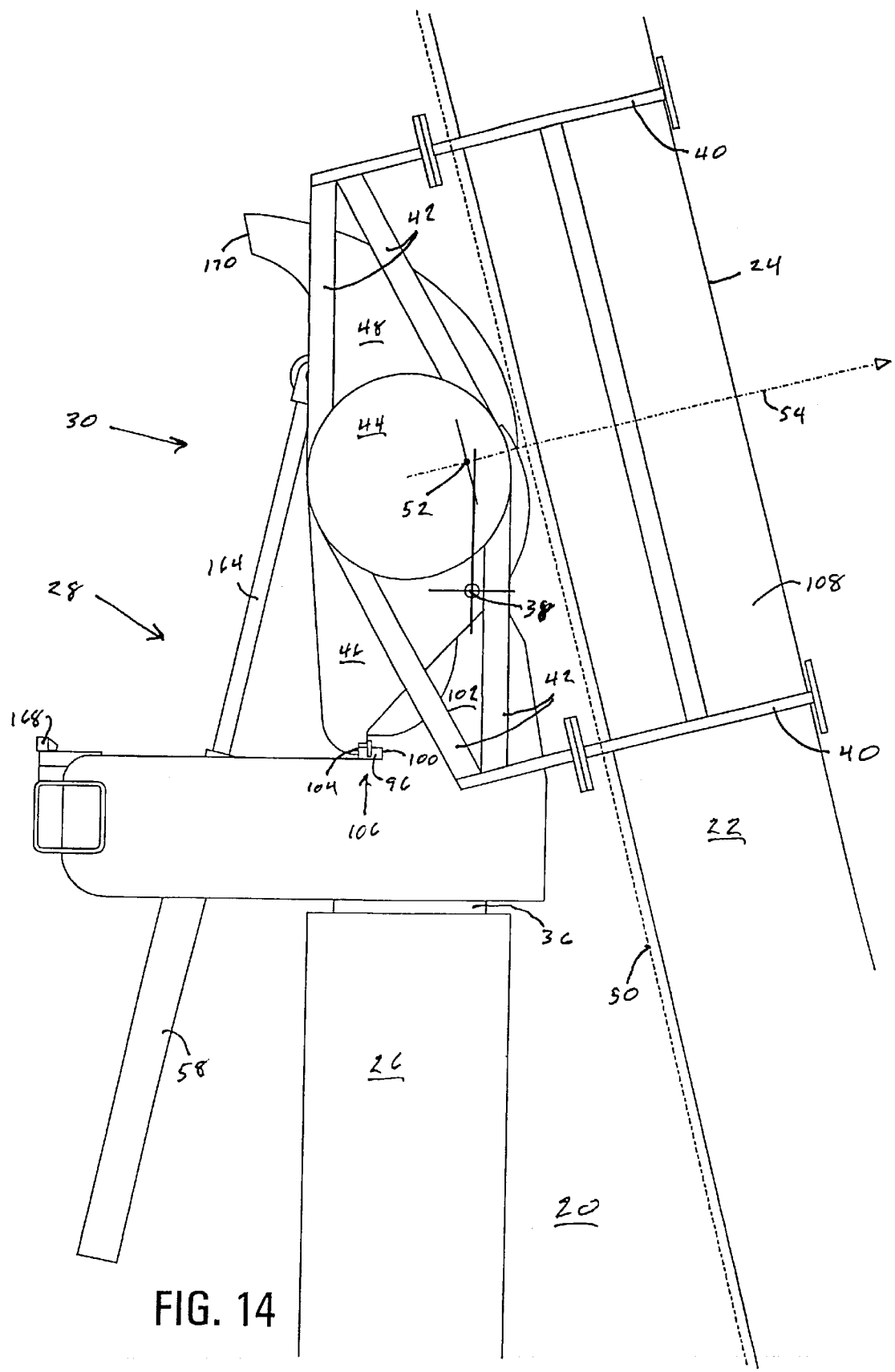
FIG. 14 shows a side view of the portion of the celestial tracking apparatus of FIG. 2 demonstrating a collector assembly in an anti-wind-stow safety position in accordance with a preferred embodiment of the present invention.

FIGS. 5 and 14 show a side view of a portion of celestial tracking apparatus 20 demonstrating an anti-wind-stow safety device 96 in a disengaged position (FIG. 5) and an engaged position (FIG. 14) in accordance with a preferred embodiment of the present invention. The following discussion refers to FIGS. 3, 5, 13, and 14.

It is desirable that process 94 (FIG. 13) be inhibited from placing celestial tracking apparatus 20 into wind stow when it is unsafe, e.g., when a technician is working between tracking assembly 28 and collector assembly 30. To this end, apparatus 20 incorporates anti-wind-stow safety device 96

(FIGS. 3, 5 and 14). In the preferred embodiment, safety device 96 is a bar that is pivotally or slidably coupled to tracking assembly 28. When in a disengaged position 98, safety device 96 is pivoted away from safety notches 100 in pivot supports 102 of tracking assembly 28. Safety dogs 104 (FIG. 5) on pivot levers 46 of collector assembly 30 are unobstructed by safety device 96 when in disengaged position 98.

When it is desired that celestial tracking apparatus 20 be inhibited from entering wind stow, safety device 96 is pivoted from disengaged position 98 (FIG. 5) and into an engaged position 106 (FIG. 14). In engaged position 106, safety device 96 is entrapped by safety notches 100 and safety dogs 104, thereby preventing collector assembly 30 from pivoting further from proximally horizontal position 62 (FIG. 5) than an anti-wind-stow safety position 108 (FIG. 14). Those skilled in the art will appreciate that other embodiments of safety device 96 may be used without departing from the spirit of the present invention.

In wind-stow control process 94 (FIG. 13), a query task 110 determines if safety device 96 is in engaged position 106, i.e., if celestial tracking apparatus 20 is inhibited from entering wind stow. If task 110 determines that safety device 96 is in engaged position 106, then a task 112 is executed to release collector assembly 30 from anti-wind-stow safety position 108. Task 112 is a manual task, typically performed by a technician involved in the maintenance or other procedures that required collector assembly 30 to have been placed into anti-wind-stow safety position 108. Process 94 waits until the execution of task 112 has been completed, which takes an indeterminate length of time. The execution of task 112 requires that collector assembly be pivoted from anti-wind-stow safety position 108 (FIG. 14) into proximally horizontal position 62 (FIG. 5), and safety device 96 (FIGS. 3, 5, and 14) be manually moved from engaged position 106 (FIG. 14) into disengaged position 98 (FIG. 5).

Following the completion of task 112, process 94 executes a task 114 to resume normal operation.

After task 114 resumes normal operation, or if task 110 determines that safety device 96 is not in engaged position 106 (i.e., is in disengaged position 98), a query task 116 determines if apparatus 20 is already in wind stow. If task 116 determines that apparatus 20 is not in wind stow, a query task 118 determines if it is desired that safety device 96 be moved into engaged position 106. Task 118 is a manual task, that is, when it is desired that safety device 96 be moved into engaged position 106, i.e., that collector assembly 30 be moved into anti-wind-stow safety position 108, the an operator or technician initiates an action to cause this to occur. This action may be in initiation of an operator command or the engagement of an override switch. Those skilled in the art will appreciate, therefore, that while task 118 is depicted for convenience between tasks 116 and 120/122, task 118 may actually be implemented in an interrupt fashion anywhere within process 94.

If task 118 determines that it is desired that safety device 96 be moved into engaged position 106, then a task 120 is executed to move collector assembly 30 into anti-wind-stow safety position 108. Task 120 is a manual task, typically performed by a technician involved in the maintenance or other procedures that requires collector assembly 30 to be placed into anti-wind-stow safety position 108. Process 94 waits until the execution of task 120 has been completed, which takes an indeterminate length of time. The execution of task 120 requires that collector assembly be pivoted into proximally horizontal position 62 (FIG. 5), safety device 96 (FIGS. 3, 5, and 14) be manually moved from disengaged position 98 (FIG. 14) into engaged position 106 (FIG. 5), and collector assembly 30 be pivoted into anti-wind-stow safety position 108 (FIG. 14).

Following the completion of task 120, process 94 returns to task 110 discussed hereinbefore.

Figures 15, 16, 17:
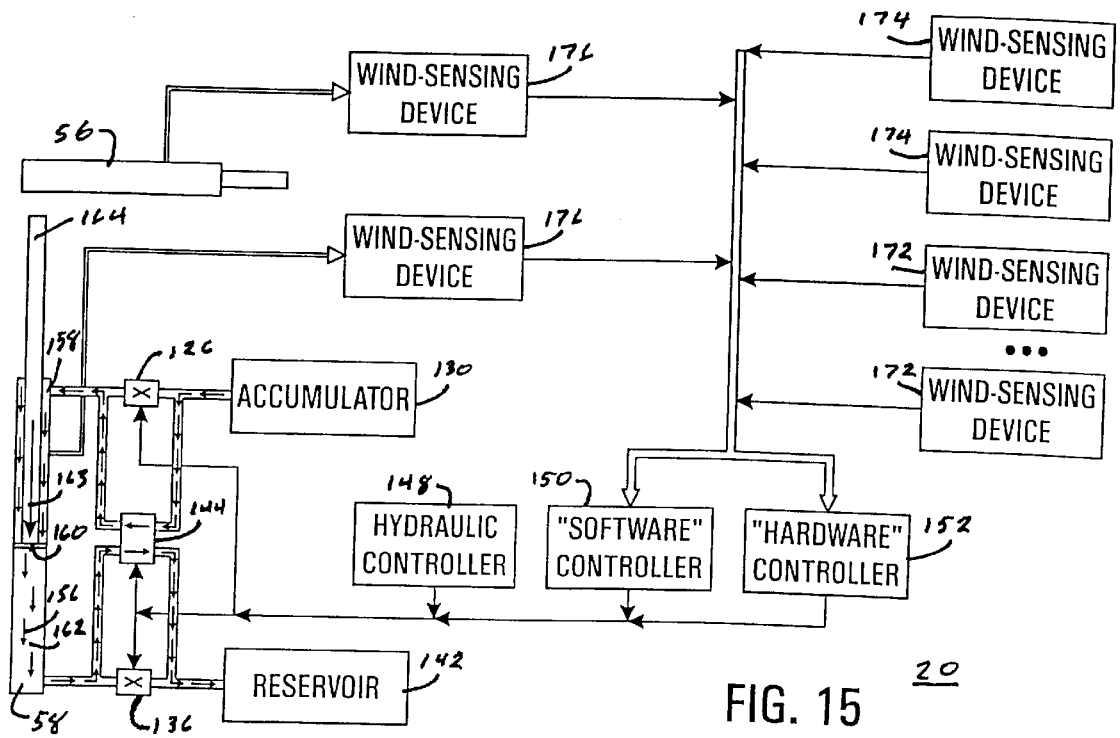
FIG. 15 shows a simplified block diagram of portions of a celestial tracking apparatus concerned with the wind-stow control process of FIG. 13 and demonstrating an elevation actuator raising a collector assembly in accordance with a preferred embodiment of the present invention.
FIG. 16 shows a portion of the block diagram of FIG. 15 demonstrating an elevation actuator lowering a collector assembly in accordance with a preferred embodiment of the present invention.
FIG. 17 shows a portion of the block diagram of FIG. 15 demonstrating an elevation actuator placing a collector assembly into wind stow in accordance with a preferred embodiment of the present invention.

FIGS. 15, 16, and 17 show simplified block diagrams of portions of celestial tracking apparatus 20 concerned with wind-stow control process 93 and demonstrating elevation actuator 58 raising collector assembly 30 during normal operation (FIG. 15), lowering collector assembly 30 during normal operation (FIG. 16), and placing collector assembly 30 into wind-stow position 66 in accordance with a preferred embodiment of the present invention. The following discussion refers to FIGS. 15 through 17.

FIGS. 15 and 16 demonstrate normal operation of elevation actuator 58 in the preferred embodiment of celestial tracking apparatus 20. Within apparatus 20, three controllers are used to control normal and wind-stow operations. A hydraulic controller 148 encompasses all the circuitry and devices necessary to control the hydraulics of apparatus 20. A "software" controller 150 encompasses all the circuitry and components required to control the operations of apparatus 20 in response to software instructions from an associated computer coupled to external sensors. A "hardware" controller 152 encompasses all the circuitry and components required to control the operation of apparatus 20 in direct response to the external sensors. Those skilled in the art will appreciate that the actual circuitry and components encompassed by controllers 148, 150, and 152 are irrelevant to the present invention and beyond the scope of this discussion.

To better understand the operation of celestial tracking apparatus 20 when undergoing wind stow, is it best that a brief discussion of normal (i.e., non-wind-stow) operation be provided.

Elevation actuator 58 (FIGS. 3, 15, and 16) of apparatus 20 is used to raise or lower collector assembly 30 under control of controllers 148, 150 and/or 152. This is accomplished in the preferred embodiment via elevation actuator 58 through hydraulic accumulator 130, hydraulic reservoir 142, and control valves 126, 136, and 144. Hydraulic accumulator 130 is normally kept "charged," i.e., in a pressurized condition, and provides a source of hydraulic energy to drive collector assembly 30.

Control valves 126 and 136 are "normally-open" wind-stow valves. That is, control valves 126 and 136 are open when no signal is provided. Under normal, non-wind-stow operation, a signal is provided and valves 126 and 136 are kept closed.

Control valve 144 is a "normally-closed" tri-state cross-over valve. That is control valve 144 is a valve having two inputs ("A" and "B") and two outputs ("a" and "b"), open "A-a" and "B-b" for a first signal (state 1), open "A-b" and "B-a" for a second signal (state 3), and closed when no signal is provided (state 3).

The following discussion refers to FIGS. 3, 5, and 15.

To raise collector assembly 30 (i.e., to move collector assembly 30 away from proximally horizontal position 62) in normal operation, at least one of controllers 148, 150, and 152 provides a signal to wind-stow valves 126 and 136, and provides a first signal to elevation-actuator control valve 144. Wind-stow valves 126 and 136 are therefore closed and elevation-actuator control valve 144 is in an "A-a" and "B-b" configuration. Pressurized accumulator 130 then forces a hydraulic fluid 156 to pass from accumulator 130, through the "A-a" passage of valve 144, and into an upper chamber 158 of elevation actuator 58. This forces a movement 163 of a piston 160 downward within actuator 50, which in turn forces hydraulic fluid 156 to pass from a lower chamber 162 of actuator 58, through the "B-b" passage of valve 144, and into reservoir 142. Piston 160 is connected to a piston rod 164, which is in turn connected to collector assembly 30. Movement 163 of piston 160 downward causes rod to pull on collector assembly 30, which then pivots away from proximally horizontal position 62.

The following discussion refers to FIGS. 3, 5, and 16.

To lower collector assembly 30 (i.e., to move collector assembly 30 towards proximally horizontal position 62) in normal operation, at least one of controllers 148, 150, and 152 provides a signal to wind-stow valves 126 and 136, and provides a second signal to elevation-actuator control valve 144. Wind-stow valves 126 and 136 are therefore closed and elevation-actuator control valve 144 is in an "A-b" and "B-a" configuration. Pressurized accumulator 130 then forces hydraulic fluid 156 to pass from accumulator 130, through the "A-b" passage of valve 144, and into lower chamber 162 of elevation actuator 58. This forces movement 163 of piston 160 upward within actuator 50, which in turn forces hydraulic fluid 156 to pass from upper chamber 158 of actuator 58, through the "B-a" passage of valve 144, and into reservoir 142. Movement 163 of piston 160 upward causes rod to push on collector assembly 30, which then pivots towards proximally horizontal position 62.

The following discussion refers to FIGS. 3, 5, 7, and 17.

To move collector assembly 30 into wind-stow position 66, signals are removed from valves 126, 136, and 144. Wind-stow valves 126 and 136 are therefore open and elevation-actuator control valve 144 is closed for both inputs. Pressurized accumulator 130 then forces hydraulic fluid 156 to pass from accumulator 130, through now-open wind-stow accumulator valve 126, and into upper chamber 158 of elevation actuator 58. This forces a movement 163 of piston 160 downward within actuator 50, which in turn forces hydraulic fluid 156 to pass from lower chamber 162 of actuator 58, through wind-stow reservoir valve 136, and into reservoir 142. Piston 160 is connected to a piston rod 164, which is in turn connected to collector assembly 30. Movement 163 of piston 160 downward causes rod to pull on collector assembly 30, which then pivots away from proximally horizontal position 62.

The following discussion refers to FIGS. 15 and 17.

As hereinbefore mentioned, it is desirable that celestial tracking apparatus 20 automatically enter wind stow as a default or condition. This desirably occurs whenever a wind is detected having a speed above a predetermined excessive wind speed for a predetermined length of time, whenever a system failure occurs, and/or whenever an "enter wind stow" command is received. This represents a "fail-safe" wind-stow operation, where apparatus 20 is protected by the automatic placement of collector assembly 30 into wind-stow position 66 in the event of system failure.

To achieve this fail-safe wind-stow operation, celestial tracking apparatus 20 has, in the preferred embodiment of FIGS. 15, 16, and 17, normally-open wind-stow accumulator valve 126, normally-open wind-stow reservoir valve 136, and normally-closed elevation-actuator control valve 144. Additionally, since hydraulic accumulator 130 is normally kept charged, hydraulic accumulator provides a source of stored energy to drive collector assembly 30 into wind-stow position 66 in all conditions except total hydraulic failure on an accumulator side of elevation actuator 58.

Since wind-stow accumulator valve 126 and wind-stow reservoir valve 136 are normally-open, while elevation-actuator control valve 144 is normally closed, a signal is required for apparatus 20 to remain out of wind stow. Controllers 148, 150, and 152 are desirably connected so that a consensus of all controllers 148, 150, and 152 is required to provide such a signal. That is, the failure of any of controllers 148, 150, or 152 to provide the necessary signal results in the reversion of valves 126, 136 and 144 to their normal condition.

The following discussion refers to FIGS. 3, 7, 13, 17, and 16.

If task 118 (FIG. 13) determines that safety device 96 is not to be moved into engaged position 106, then a query task 122 determines if an "enter wind stow" command has been received from an operator. If task 122 determines that an "enter wind stow" command has been received, then a task 154 pivots collector assembly 30 into wind-stow position 66 (FIG. 7). Task 154 is accomplished by at least one of controllers 150, 152, or 154 removing a signal from valves 126, 136, and 144. Collector assembly 30 is then moved into wind-stow position 66 as discussed hereinbefore.

The following discussion refers to FIGS. 3, 6, 7, 9, and 13.

It is desirable that, once in wind-stow position 66 (FIG. 7), collector assembly 30 does not indiscriminately exit wind-stow position 66. In a task 165 (FIG. 13), collector assembly 30 is inhibited from departing from wind-stow position 66. Elevation pivot 38 is displaced from center of gravity 52 of collector assembly 30. Gravity, acting upon mass force M (FIG. 9) through center of gravity 52, is predisposed to pivot collector assembly 30 into wind-stow position 66, and to inhibit collector assembly 30 from exiting wind-stow position 66 once therein.

Additionally, in the preferred embodiment, a task 166 utilizes a latching device 168 (FIGS. 3, 6, and 7) to latch collector assembly 30 into wind-stow position 66 and inhibit exit therefrom.

Figure 6:
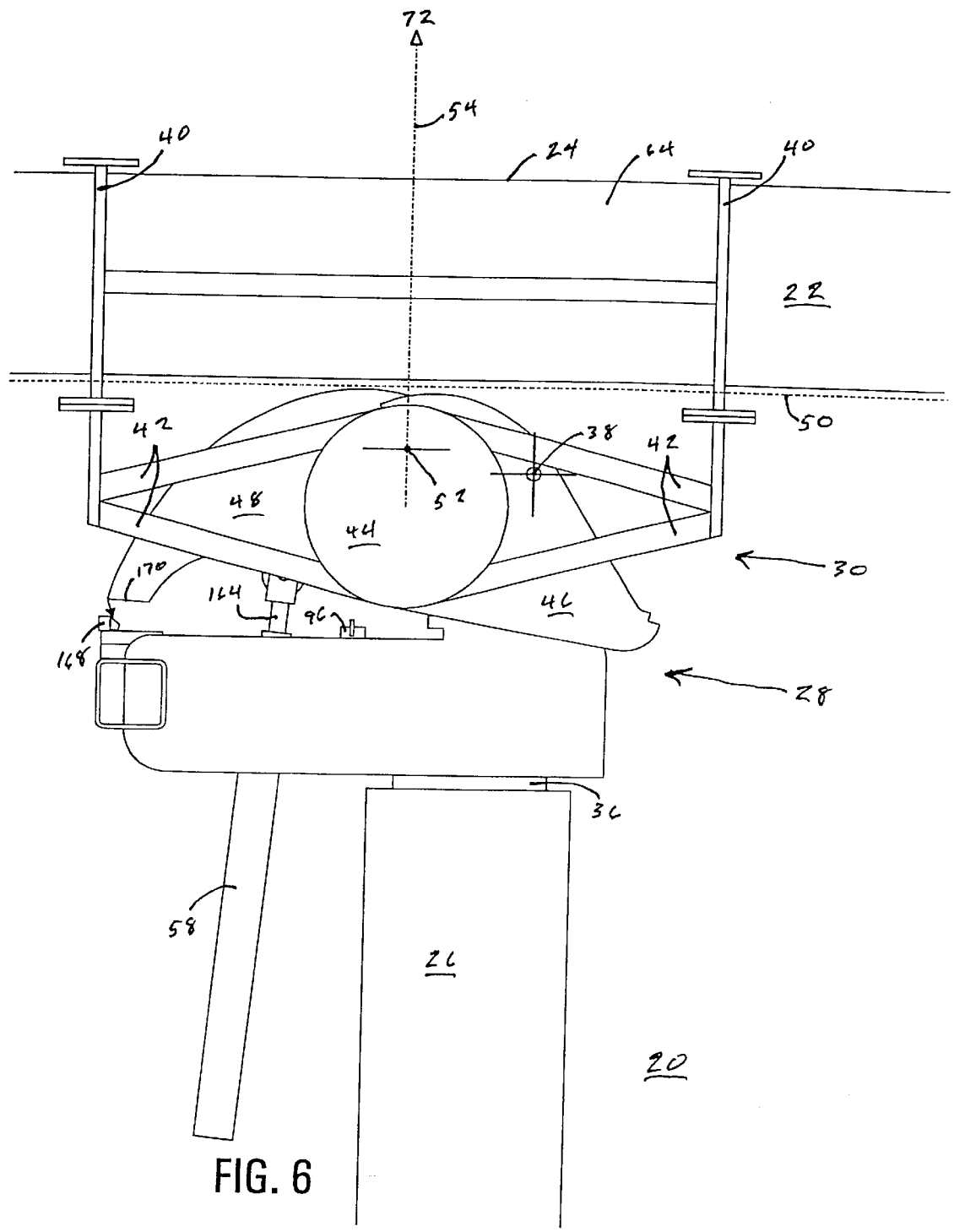
FIG. 6 shows a side view of the portion of the celestial tracking apparatus of FIG. 2 demonstrating a collector assembly in a vertical position in accordance with a preferred embodiment of the present invention.

In one embodiment, latching device 168 may be a spring-loaded latch. As collector assembly 30 pivots into wind-stow position 66, a tip 170 of overtravel stop lever 48 engages latching device 168 (FIG. 6). Once collector assembly 30 has attained wind-stow position 66, latching device 168 inhibits collector assembly 30 from exiting wind-stow position 66 (FIG. 7).

It will be appreciated by those skilled in the art that the operation of latching device 168 is irrelevant to the present invention. Latching device 168 may be mechanically, hydraulically, or electrically operated without departing from the spirit of the present invention.

Following the completion of task 166, process 94 returns to task 116 discussed hereinbefore.

The following discussion refers to FIGS. 1, 2, 13, 15, and 17.

If task 122 (FIG. 13) determines that an "enter wind stow" command has not been received, then process 94 determines if a wind having an excessive force has been detected. In order to detect a wind force, celestial tracking apparatus 20 needs have some form of wind-sensing device. In the preferred embodiment, several different forms of wind-sensing devices are incorporated.

One form of wind-sensing device may be wind-speed or wind-force sensors 172 (FIGS. 1, 2, and 15). In the preferred embodiment of FIGS. 1 and 2, sensors 172 are anemometers. Preferably, a plurality of sensors 172 are used, with at least one sensor 172 being a local sensor, i.e., located proximate apparatus 20, and at least one other sensor 172 being a remote sensor, i.e., located at some distance from apparatus 20. In the preferred multiple-apparatus embodiment of FIG. 1, each apparatus 20 has as a local sensor 172 the sensor 172 affixed to that apparatus 20, and has as remote sensors 172 the sensors 172 affixed to other apparatuses 20.

Another form of wind-sensing device may be a wind-load sensor. In the preferred embodiment of FIGS. 2 and 15, the wind-load sensors are a pair of optical distortion sensors 174 (each having a transmitter and a receiver) cross-coupled across the back of collector 22. A wind exceeding a predetermined limit will cause a distortion of collector 22. Sensors 174 monitor the distortion of collector 22.

In the preferred embodiment of FIG. 15, the wind-load sensors are a pair of torque sensors 176. Sensors 176 are coupled to azimuth and elevation actuator 56 and 58. A wind exceeding a predetermined limit will cause a variation in the torque applied to actuator 56 and 58. Sensors 176 monitor the torque of actuators 56 and 58.

Those of ordinary skill in the art will appreciate that the wind-sensing devices described hereinbefore are exemplary only. Other devices, such as Pitot-static tubes, strain gauges, etc., may be used without departing from the spirit of the present invention.

A query task 178 determines if software controller 150 detects a wind having a speed greater than a first (lower) predetermined excessive wind speed for at least a predetermined period of time. To accomplish task 178, software controller 150 is coupled to a wind-sensing device, i.e., any sensor 172, 174, and/or 176. Desirably, task 178 determines if a wind greater than 15.6 m/s (approximately 35 mph) has been detected for at least 2 s. In the preferred embodiment, task 178 determines if a wind greater than 11.2 m/s (approximately 25 mph) has been detected for at least 10 s. Through the introduction of a time factor, the placement of celestial tracking apparatus 20 into wind stow may be averted for momentary gusts.

If task 178 determines that software controller 150 detects a high-winds condition, then in task 154 software controller 150 removes the signal from valves 126, 136, and 144. Collector assembly 30 is then moved into wind-stow position 66 as discussed hereinbefore.

If task 178 determines that software controller 150 has not detected a wind in excess of the lower predetermined excessive wind speed, then a query task 182 determines if hardware controller 152 detects a wind having a speed greater than a second (higher) predetermined excessive wind speed for at least the predetermined period of time. To accomplish task 182, hardware controller 152, too, is coupled to sensors 172, 174, and/or 176. In the preferred embodiment, task 182 determines if a wind of at least 12.1 m/s (approximately 25 mph) has been detected for at least 10 s. Hardware controller 152 is ideally a circuit hard-wired to react to the signals from sensors 172, 174, and/or 176 at the higher predetermined excessive wind speed.

If task 180 determines that hardware controller 152 detects a high-winds condition, then in task 154 hardware controller 152 removes the signal from valves 126, 136, and 144. Collector assembly 30 is then moved into wind-stow position 66 as discussed hereinbefore.

Through the use of software and hardware controllers 150 and 152 being set to react to the lower and higher predetermined excessive wind speeds, respectfully, celestial tracking apparatus provides a degree of fail-safe wind-stow operation that would not be possible with a single controller.

The following discussion refers to FIGS. 3, 4, 7, 13, and 15 through 17.

If task 180 determines that hardware controller 152 has not detected a wind in excess of the higher predetermined excessive wind speed, then a task 184 determines if there is a system failure (a failure condition) of celestial tracking apparatus 20. If task 184 determines that a failure condition exists, then task 154 is executed. In a system failure, the electrical power may fail, a control system may fail, controllers 148, 150, and/or 152 may fail, and/or one or more of sensors-172, 174, and/or 176 may fail. In the event of a system failure, the signal is removed from control valves 126, 136, and 144 either directly (as with a power failure) or through the action of at least one controller 148, 150, and 152. Collector assembly 30 is then moved into wind-stow position as discussed hereinbefore.

Alternatively, a system failure may be hydraulic. For example, a hydraulic line between accumulator 130 and control valve 126 may fail. In the event of hydraulic failure, hydraulic controller 130 removes the signal from control valves 126, 136, and 144 (FIGS. 15 and 17). Since the failure is hydraulic in nature, accumulator 130 cannot be relied upon to force collector assembly 30 into wind-stow position 66 as described hereinbefore. Instead, the fail-safe gravity wind stow activity of celestial tracking apparatus 20 comes into play.

Elevation pivot 38 is offset from center of gravity 52 of collector assembly 30. In normal operation (FIG. 4), this offset condition places center of gravity 52 behind elevation pivot 38. Gravity therefore exerts a force 186 (FIG. 17) upon elevation-actuator rod 164. Force 186 causes rod 164 to descend. This is turn causes piston 160 within actuator 58 to descend. This descent forces hydraulic fluid 156 out of lower chamber 162 of actuator 58.

If task 184 determines that no failure condition exists, then operation is normal (pseudo-task 188) and process 94 returns to task 116 discussed hereinbefore. In normal operation, controllers 148, 150, and 152 work together to keep collector assembly in an arbitrary position 60 (FIG. 4) where target axis 54 points at the desired celestial object.

The following discussion refers to FIGS. 7, and 13.

If task 116 (FIG. 13) determines that apparatus 20 is already in wind stow (FIG. 7), a query task 190 determines if collector assembly 30 is in wind stow because of high winds detected by software controller 150.

If task 190 determines that software controller 150 detected a high-winds condition, then a query task 192 determines if the wind has abated to less than a predetermined safe wind speed for a predetermined length of time (a safe-wind condition). Desirably, task 192 determines if a wind of less than 4.5 m/s (approximately 10 mph) has been detected for at least 300 s. In the preferred embodiment, task 192 determines if a wind of less than 3.4 m/s (approximately 7.5 mph) has been detected for at least 3600 s.

If task 192 determines that a safe-winds condition exits, then a task 194 releases latching device 168 (FIG. 7), and a task 196 pivots collector assembly 30 out of wind-stow position 66. Following the completion of task 196, process 94 returns to task 114 to resume normal operation as discussed hereinbefore.

If task 190 determines that collector assembly 30 was not in wind stow because software controller 150 detected a high-winds condition, then a query task 191 determines if collector assembly 30 is in wind stow because of high winds detected by hardware controller 152.

If task 191 determines that hardware controller 152 detected a high-winds condition, then a query task 193 determines if the wind has abated to less than the predetermined safe wind speed for the predetermined length of time.

If task 191 determines that collector assembly 30 was not in wind stow because hardware controller 152 detected a high-winds condition, then a query task 195 determines if a system failure occurred. Because apparatus 20 may be in wind stow because of a high-winds condition (already dealt with), by an operator command, or by a system failure, then acknowledgement by software controller 150 that no operator command was received indicates that apparatus 20 is in wind stow because of system failure.

If task 195 determines that a failure condition existed, then a query task 197 determines if the failure has been corrected. This may be accomplished though system diagnostics, operator analysis, etc.

If task 195 determines that no failure condition existed, or if task 197 determines that the failure has been corrected, then a task 198 determines if an "exit wind stow" command has been received. If task 198 determines that an "exit wind stow" command has been received, then process 94 move to task 194 discussed hereinbefore.

If tasks 192 or 193 determines that a safe-winds condition does not exist, if task 197 determines that the failure has not been corrected, or if task 198 determines that an "exit wind stow" command has not been received, then process 94 returns to task 116 discussed hereinbefore.

The following discussion refers to FIGS. 7, 15, and 17.

Normally open wind-stow accumulator and reservoir valves 126 and 136 may be implemented independently of other valves and feed lines used for normal operation. This allows valves 126 and 136, and associated feed lines, to be of a bore sufficient to allow movement into wind stow (FIG. 7) to be effected at a greater speed than other (normal operation) movements, thereby shortening the time required for celestial tracking apparatus 20 to enter wind stow.

In summary, the present invention teaches a celestial tracking apparatus 20 and wind-stow control process 94 therefor. Process 94 automatically places apparatus 20 into wind stow when a wind exceeds a predetermined excessive wind speed for a predetermined length of time, and automatically removes apparatus 20 from wind stow when the wind has abated below a predetermined safe wind speed for a predetermined length of time. Process 94 also automatically places apparatus 20 into wind stow upon occurrence of a system failure. Apparatus 20 may be indefinitely retained in wind stow or, conversely, may be indefinitely inhibited from entering wind stow.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A celestial tracking apparatus comprising:
    a support;
    a tracking assembly;
    a collector assembly having a center of gravity, having a facing plane, and having a target axis substantially perpendicular to said facing plane and passing through said center of gravity;
    a first pivot coupled between said support and said tracking assembly and configured to azimuthally pivot said target axis; and
    a second pivot coupled between said tracking assembly and said collector assembly, configured to elevationally pivot said target axis from a proximally horizontal direction to a wind-stow direction farther from said proximally horizontal direction than a vertical direction, and displaced from said target axis and said center of gravity thereupon so that said target axis pivots to said wind-stow direction.

2. An apparatus as claimed in claim 1 wherein said collector assembly comprises a collector having a substantially flat surface substantially parallel to said facing plane.

3. An apparatus as claimed in claim 2 wherein said substantially flat surface has an area greater than or equal to 125 m$^2$.

4. An apparatus as claimed in claim 1 wherein said collector assembly comprises a solar collector.

5. An apparatus as claimed in claim 1 wherein:
    said collector assembly comprises a substantially flat solar collector; and
    said tracking assembly is configured to cause said target axis to substantially track the sun.

6. An apparatus as claimed in claim 1 wherein said second pivot is displaced from said center of gravity so that gravity, acting upon said center of gravity, is predisposed to pivot said target axis to said wind-stow direction.

7. An apparatus as claimed in claim 1 wherein said wind-stow direction is between 1° and 7° farther from said proximally horizontal direction than said vertical direction.

8. An apparatus as claimed in claim 1 additionally comprising a controller coupled to said second pivot and configured to cause said target axis to pivot to said wind-stow direction when said controller determines said apparatus has sustained a system failure.

9. An apparatus as claimed in claim 8 wherein said system failure is one of a control-system failure, an electrical-system failure, and a hydraulic-system failure.

10. An apparatus as claimed in claim 1 wherein:
    said collector assembly comprises a collector having a substantially flat surface;
    said apparatus additionally comprises a wind-sensing device; and
    a controller coupled to said second pivot and configured to cause said target axis to pivot to said wind-stow direction when said wind-sensing device indicates said wind is beyond a predetermined threshold.

11. An apparatus as claimed in claim 10 wherein said wind-sensing device is one of a wind-force sensor, a distortion sensor, and a torque sensor.

12. An apparatus as claimed in claim 1 additionally comprising:
    a plurality of wind-sensing devices; and
    a controller coupled to said second pivot, coupled to said plurality of wind-sensing devices, and configured to cause said collector assembly to assume said wind-stow position when one of said plurality of wind-sensing devices senses a wind having a speed above a predetermined speed.

13. A celestial tracking apparatus comprising:
    a support;
    a tracking assembly;
    a first pivot coupled between said support and said tracking assembly;
    a collector assembly having a center of gravity, having a facing plane, and having a target axis substantially perpendicular to said facing plane and passing through said center of gravity;
    a second pivot coupled between said tracking assembly and said collector assembly, and displaced from said target axis and said center of gravity thereupon so that said collector assembly pivots to a wind-stow position in a presence of a failure in said apparatus;

a wind-sensing device;

a first controller coupled to said second pivot, coupled to said wind-sensing device, and configured to cause said collector assembly to assume said wind-stow position when said wind-sensing device senses a wind having a speed greater than a first predetermined speed; and a second controller coupled to said second pivot, coupled to said wind-sensing device, and configured to cause said collector assembly to assume said wind-stow position when said wind-sensing device senses a wind having a speed greater than a second predetermined speed, said second predetermined speed being greater than said first predetermined speed.

14. A celestial tracking apparatus comprising:

a support;

a tracking assembly;

a first pivot coupled between said support and said tracking assembly;

a collector assembly having a center of gravity, having a facing plane, and having a target axis substantially perpendicular to said facing plane and passing through said center of gravity;

a second pivot coupled between said tracking assembly and said collector assembly, and displaced from said target axis and said center of gravity thereupon so that said collector assembly pivots to a wind-stow position in a presence of a failure in said apparatus; and a latching device configured to inhibit movement of said collector assembly out of said wind-stow position.

15. A celestial tracking apparatus comprising:

a support;

a tracking assembly;

a first pivot coupled between said support and said tracking assembly;

a collector assembly having a center of gravity, having a facing plane, and having a target axis substantially perpendicular to said facing plane and passing through said center of gravity;

a second pivot coupled between said tracking assembly and said collector assembly, and displaced from said target axis and said center of gravity thereupon so that said collector assembly pivots to a wind-stow position in a presence of a failure in said apparatus; and a safety device configured to inhibit movement of said collector assembly into said wind-stow position.

16. A celestial tracking apparatus comprising:

a support;

a tracking assembly;

a first pivot coupled between said support and said tracking assembly;

a first actuator coupled between said support and said tracking assembly and configured to azimuthally pivot said target axis about said first pivot;

a second actuator coupled between said tracking assembly and said collector assembly and configured to elevationally pivot said target axis about said second pivot from a proximally horizontal direction to a wind-stow direction farther from said proximally horizontal direction than a vertical direction;

a collector assembly having a center of gravity, having a facing plane, and having a target axis substantially perpendicular to said facing plane and passing through said center of gravity;

a second pivot coupled between said tracking assembly and said collector assembly, and displaced from said target axis and said center of gravity thereupon so that said collector assembly pivots to a wind-stow position in a presence of a failure in said apparatus; and a controller coupled to said first actuator, coupled to said second actuator, and configured to cause said target axis to assume a wind-stow direction.

17. A method of controlling the placement of a collector assembly of a celestial tracking apparatus into a wind-stow position, said method comprising pivoting said collector assembly about a pivot, wherein:

said collector assembly has a center of gravity, a facing plane, and a target axis substantially perpendicular to said facing plane and passing through said center of gravity;

said pivoting activity elevationally pivots said collector assembly from a first position wherein said target axis effects a direction between a proximally horizontal direction and a vertical direction, to a wind-stow position wherein said target axis effects a wind-stow direction farther from said proximally horizontal direction than said vertical direction; and said pivot is displaced from said target axis and said center of gravity thereupon so that said target axis pivots to said wind-stow direction.

18. A method as claimed in claim 17 wherein:

said method additionally comprises receiving a command to enter wind stow from an operator; and said pivoting activity pivots said target axis to said wind-stow direction in response to said command.

19. A method as claimed in claim 17 wherein:

said method additionally comprises receiving a command to exit wind stow from an operator; and said pivoting activity pivots said target axis away from said wind-stow direction in response to said command.

20. A method as claimed in claim 17 wherein:

said method additionally comprises determining the occurrence of a system failure within said apparatus; and said pivoting activity pivots said target axis to said wind-stow direction when said determining activity determines said system failure has occurred within said apparatus.

21. A method as claimed in claim 17 additionally comprising inhibiting, through the influence of gravity, movement of said collector assembly out of said wind-stow position.

22. A method of controlling the placement of a collector assembly of a celestial tracking apparatus into a wind-stow position, said method comprising:

determining if a wind has a speed greater than or equal to a predetermined speed for at least a predetermined period of time; and pivoting said collector assembly about a pivot, wherein:
said collector assembly has a center of gravity, a facing plane, and a target axis substantially perpendicular to said facing plane and passing through said center of gravity;

said pivot is displaced from said target axis and said center of gravity so that said collector assembly pivots to said wind-stow position in a presence of a failure in said apparatus; and said collector assembly pivots into said wind-stow position when said determining activity determines said wind has a speed greater than or equal to said predetermined speed for at least said predetermined period of time.

23. A method as claimed in claim 22 wherein:

said predetermined speed is less than or equal to 15.6 m/s; and said predetermined period of time is greater than or equal to 2 s.

24. A method as claimed in claim 22 wherein said predetermined speed is a first predetermined speed and said predetermined period of time is a first predetermined period of time, and wherein:

said method additionally comprises establishing if said collector assembly is in said wind-stow position;

said method additionally comprises ascertaining, when said establishing activity establishes that said collector assembly is in said wind-stow position, if said collector assembly is in said wind-stow position because said determining activity determined said wind had a speed greater than or equal to said first predetermined speed for at least said first predetermined period of time;

said method additionally comprises discovering if said wind has a speed less than or equal to a second predetermined speed for at least a second period of time; and said pivoting activity pivots said collector assembly out of said wind-stow position when said ascertaining activity ascertains that said collector assembly is in said wind-stow position because said determining activity determined said wind had a speed greater than or equal to said first predetermined speed for at least said first predetermined period of time and said discovering activity discovers said wind has a speed less than or equal to a second predetermined speed for at least a second period of time.

25. A method as claimed in claim 24 wherein:

said first predetermined speed is less than or equal to 15.6 m/s;

said first predetermined period of time is greater than or equal to 2 s;

said second predetermined speed is greater than or equal to 3.4 m/s; and said second predetermined period of time is less than or equal to 3600 s.

26. A method of controlling the placement of a collector assembly of a celestial tracking apparatus into a wind-stow position, said method comprising:

a) determining, in a first controller, if a wind has a speed greater than a first predetermined speed;

b) determining, in a second controller, if a wind has a speed greater than a second predetermined speed; and c) pivoting said collector assembly about a pivot, wherein:

said collector assembly has a center of gravity, a facing plane, and a target axis substantially perpendicular to said facing plane and passing through said center of gravity;

said pivot is displaced from said target axis and said center of gravity so that said collector assembly pivots to said wind-stow position in a presence of a failure in said apparatus; and said collector assembly pivots into said wind-stow position when one of said determining activity a) and said determining activity b) determines said wind has a speed greater than one of said first predetermined speed and said second predetermined speed, respectively, for a predetermined period of time.

27. A method as claimed in claim 26 wherein:

said first predetermined speed is less than or equal to 11.2 m/s;

said second predetermined speed is greater than or equal to 12.1 m/s; and said predetermined period of time is greater than or equal to 7.5 s.

28. A method of controlling the placement of a collector assembly of a celestial tracking apparatus into a wind-stow position, said method comprising:

pivoting said collector assembly about a pivot, wherein said collector assembly has a center of gravity, a facing plane, and a target axis substantially perpendicular to said facing plane and passing through said center of gravity, and wherein said pivot is displaced from said target axis and said center of gravity so that said collector assembly pivots to said wind-stow position in a presence of a failure in said apparatus; and latching said collector assembly into said wind-stow position.

29. A method of controlling the placement of a collector assembly of a celestial tracking apparatus into a wind-stow position, said method comprising:

pivoting said collector assembly about a pivot, wherein said collector assembly has a center of gravity, a facing plane, and a target axis substantially perpendicular to said facing plane and passing through said center of gravity, and wherein said pivot is displaced from said target axis and said center of gravity so that said collector assembly pivots to said wind-stow position in a presence of a failure in said apparatus; and inhibiting said collector assembly from moving into said wind-stow position.

30. A celestial tracking apparatus comprising:

a support;

a tracking assembly;

an azimuth pivot coupled between said tracking assembly and said support;

an azimuth actuator coupled between said support and said tracking assembly, and configured to pivot said tracking assembly about said azimuth pivot;

a collector assembly comprising:

a solar collector having a substantially flat surface;

a center of gravity;

a facing plane substantially parallel to said substantially flat surface of said solar collector;

a target axis substantially perpendicular to said facing plane and passing through said center of gravity;

an elevation pivot coupled between said collector assembly and said tracking assembly, said elevation pivot being displaced from said target axis and said center of gravity thereupon so that said collector assembly pivots to a wind-stow position in a presence of a failure in said apparatus;

an elevation actuator coupled between said tracking assembly and said collector assembly and configured to pivot said collector assembly about said elevation pivot from a proximally horizontal direction to a wind-stow direction farther from said proximally horizontal direction than a vertical direction;

a wind-speed sensor configured to determine a speed of a wind; and a controller coupled to said azimuth actuator, coupled to said elevation actuator, coupled to said wind-speed sensor, and configured to cause said collector assembly to assume a wind-stow position when said speed of said wind is greater than a predetermined speed.

* * * * *